P. H. HAMILTON.
AUTOMATIC GAS CONTROL FOR GAS WATER HEATERS.
APPLICATION FILED FEB. 27, 1915.
1,317,785.
Patented Oct. 7, 1919.
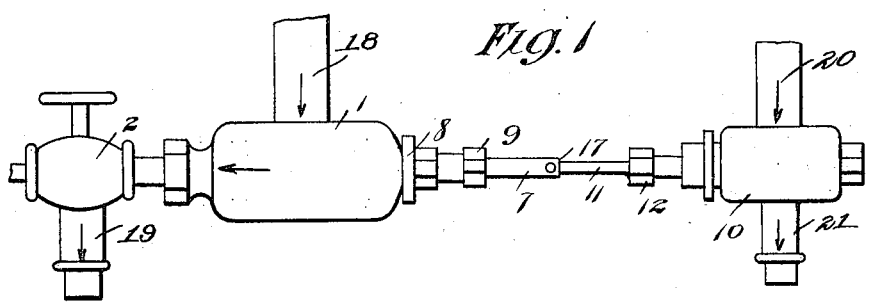
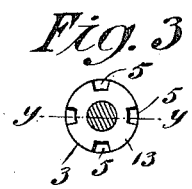
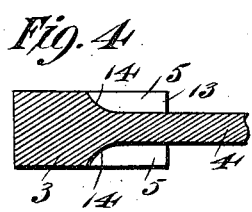
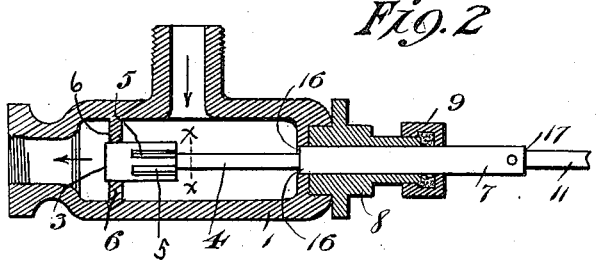
Witnesses
Geo H Ross
M Friedman
Inventor
Paul H. Hamilton.
By A. D. Jackson,
Attorney

UNITED STATES PATENT OFFICE.

PAUL H. HAMILTON, OF FORT WORTH, TEXAS, ASSIGNOR, BY MESNE ASSIGNMENTS, TO ESDA MANUFACTURING COMPANY, OF WILMINGTON, DELAWARE, A CORPORATION OF DELAWARE.

AUTOMATIC GAS CONTROL FOR GAS WATER-HEATERS.

1,317,785.  Specification of Letters Patent.  Patented Oct. 7, 1919.

Application filed February 27, 1915. Serial No. 10,955.

*To all whom it may concern:*

Be it known that I, PAUL H. HAMILTON, a citizen of the United States, residing at Fort Worth, in the county of Tarrant and State of Texas, have invented certain new and useful Improvements in Automatic Gas Controls for Gas Water-Heaters, of which the following is a specification.

My invention relates to valves and more particularly to an automatic control for instantaneous water heaters, and the object is to provide a simple device by which a supply of water is furnished to heating coils and when the device is operated the water will be started and simultaneously or automatically a supply of gas is turned into the heater. In many instantaneous water heaters, pilot lights are kept burning. In such cases, a turning of the cock to start the water to running through the coils will cause the heating gas to be turned on and the gas will be ignited by the pilot light. The object of this invention is to provide a more simple and efficient device for turning the gas for heating purposes and for operating valves in other fluid containing devices.

Other objects and advantages will be more fully explained in the following description and the invention will be more particularly pointed out in the claims.

Reference is had to the accompanying drawings which form a part of this application.

Figure 1 is a plan view of the improved controlling device. Fig. 2 is a longitudinal section of the casing, showing the improved plunger valve. Fig. 3 is a section on the line $x$—$x$ of Fig. 2. Fig. 4 is a longitudinal section of the valve, taken on the line $y$—$y$ of Fig. 3.

Similar characters of reference are used to indicate the same parts throughout the several views.

The improved controlling device is provided with a T-pipe 1 which is to be connected with any suitable water supply pipe. A water cock 2 is connected with the T-pipe 1. A plunger controller 3 is mounted in the T-pipe 1 and this controller is provided with a stem 4. The controller 3 is provided with a plurality of ports 5. The casing 1 has an integral guiding member 6 for the controller 3. The stem 4 is integral with a gas valve controlling plunger 7 and a bearing 8 is screwed into the end of the casing 1 for the controlling member 7. A packing gland 9 is screwed on the bearing member 8 to prevent the passage of water out through the bearing member 8. A gas supply valve 10 is shown in conventional form and this valve is not shown in detail because it forms no part of my invention,— my invention being for the purpose of actuating this valve and working in combination therewith for carrying out the objects of this invention. The gas valve 10 is provided with a stem 11 which operates through the stuffing box or gland 12. The gas controlling plunger 7 is rigidly connected to the stem 11. Any movement of the controller 3 will cause a corresponding movement of the stem 11 to open or close the gas valve 10.

The controller 3 is moved by the pressure of the water against the surface 13 and the bottom or end walls 14 of the ports for the purpose of turning on the water. Whenever the cock 2 is opened, the water coming through the inlet 18 of the T-pipe 1 will force the controller 3 longitudinally in the guide 6 so that the water can escape through the cock 2 and through outlet 19. As soon as the cock 2 is closed, the pressure against the surfaces 13 and 14 is much relieved and the pressure of the water will bear against the surface 16 of the plunger 7 with the same proportionate force as it bears against the surfaces 13 and 14 and as there is very little more than atmospheric pressure against the end 17 of the plunger 7, the plunger 7 will be moved by the water pressure and thus actuate the stem 11 of the gas valve so that the gas valve 10 will be closed. Whenever the water cock 2 is opened, the water will move the controller 3 and at the same time the stem 11 of the gas valve 10 will be actuated by the plunger 7 to open the gas valve 10 so that gas will enter through inlet 20 and escape through outlet 21. The gas will be turned on by the water pressure and will be ignited in the usual manner. The gas will also be cut off by the water pressure when the water cock is closed.

Any suitable stop might be provided for limiting the travel of the controller 3, but this is not necessary since the travel of the controller 3 and plunger rod 11 is limited by the gas valve so that the controller 3 can never close the water passage. The plunger rod 11 can travel only far enough to allow the gas valve to be opened and closed. The controller 3 moves freely through the guide 6, and as there is no water tight joint between the controller 3 and the guide 6, water in small quantities can pass from one side of the guide 6 to the other and equalize the pressure on each side of the guide 6 when the cock 2 is closed. The stem or plunger rod 4 is operated by water pressure because it has a greater surface and a less surface to receive water pressure. The pressure surface being so much greater on the controller 3 than on the surface 16 of plunger 7, the controller 3 will be instantly moved when the pressure against the outer end of the controller is relieved by opening cock 2. When the cock 2 is closed and the water pressure on each end of the controler 3 becomes equalized, the stem 4 will be moved to close the gas valve because the pressure on the outer end of the plunger is little more than atmospheric pressure and the pressure on the surface 16 by the water is much greater than the atmospheric pressure.

What I claim is:—

1. In an automatic control of the character specified, in combination, a casing provided with an inlet and an outlet, a relatively short restricted passageway between said inlet and outlet to permit access of fluid from said inlet to said outlet at all times, a controller mounted for movement through said passageway and accessible to fluid in said inlet and outlet portions, said controller being provided with grooves extending from the inlet toward the outlet end thereof and terminating short of the outlet end, walls of said grooves comprising a fluid pressure area on the side of the plug of differential cross-sectional area so that when water is flowing through said passageway the controller tends to move to a balanced position, and means operatable by movement of said controller for the purpose specified.

2. In a device of the character described in combination, a casing provided with an inlet chamber and an outlet chamber, a wall separating said chambers and having an opening therein, the construction of said wall being such as to afford continuous communication for fluid between said chambers, a controller plug extending through said opening and of a greater length than said opening, said controller plug being provided with grooves extending from the inlet end toward the outlet end thereof and terminating short of the outlet end, walls of said grooves comprising a dynamic flow pressure area on the side of the plug of differential cross-sectional area so that when water is flowing through said opening the plug tends to move a balanced position, and operating connections attached to said controller plug.

In testimony whereof I set my hand, in the presence of two witnesses, this 11th day of February, 1915.

PAUL H. HAMILTON.

Witnesses:
A. L. JACKSON,
J. W. STITT.

Copies of this patent may be obtained for five cents each, by addressing the "Commissioner of Patents, Washington, D. C."